Nov. 21, 1939.  H. GINNEL  2,180,821

FLUID DISPENSING APPARATUS

Filed Sept. 19, 1936  5 Sheets-Sheet 1

INVENTOR.
Henry Ginnel
BY Emery, Varney,
Whittemore & Dix
ATTORNEYS.

Nov. 21, 1939.    H. GINNEL    2,180,821
FLUID DISPENSING APPARATUS
Filed Sept. 19, 1936    5 Sheets-Sheet 2
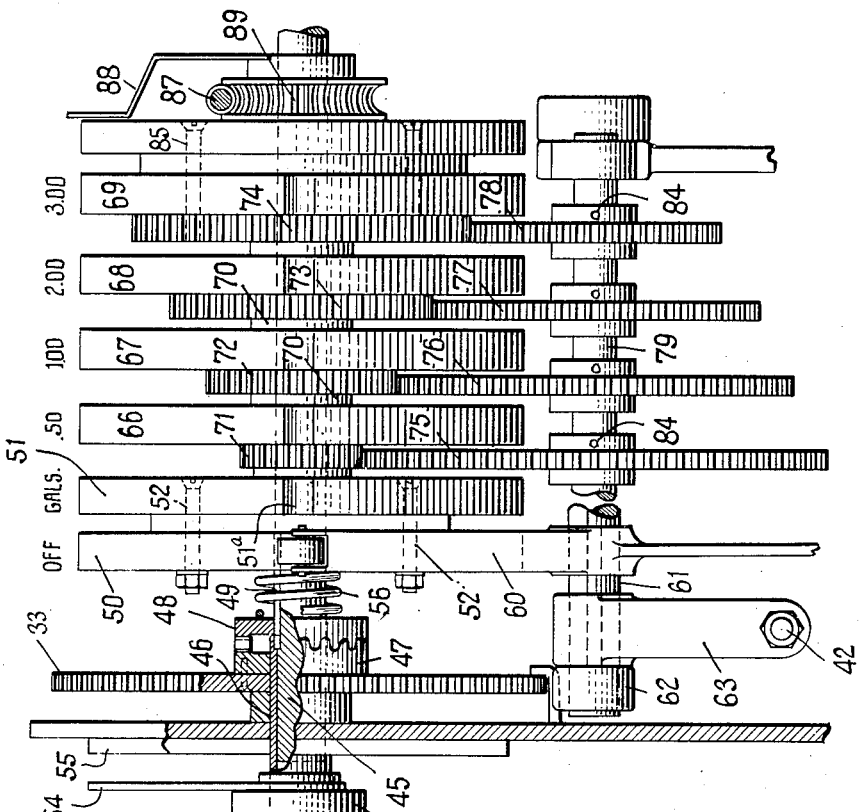
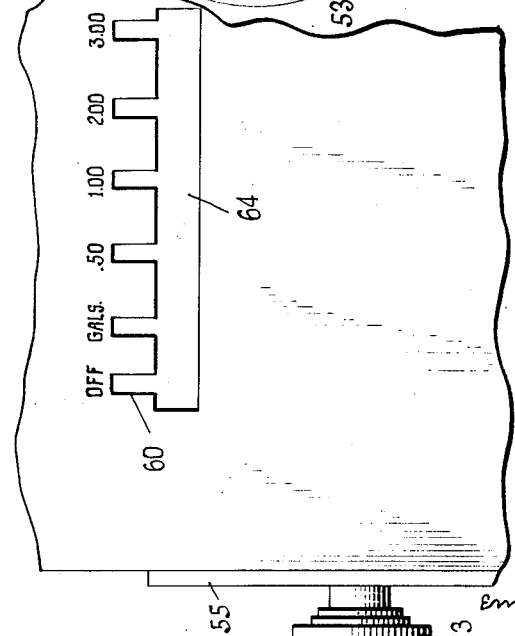
INVENTOR.
Henry Ginnel
BY
Emery, Varney, Whittemore & Dix
ATTORNEYS.

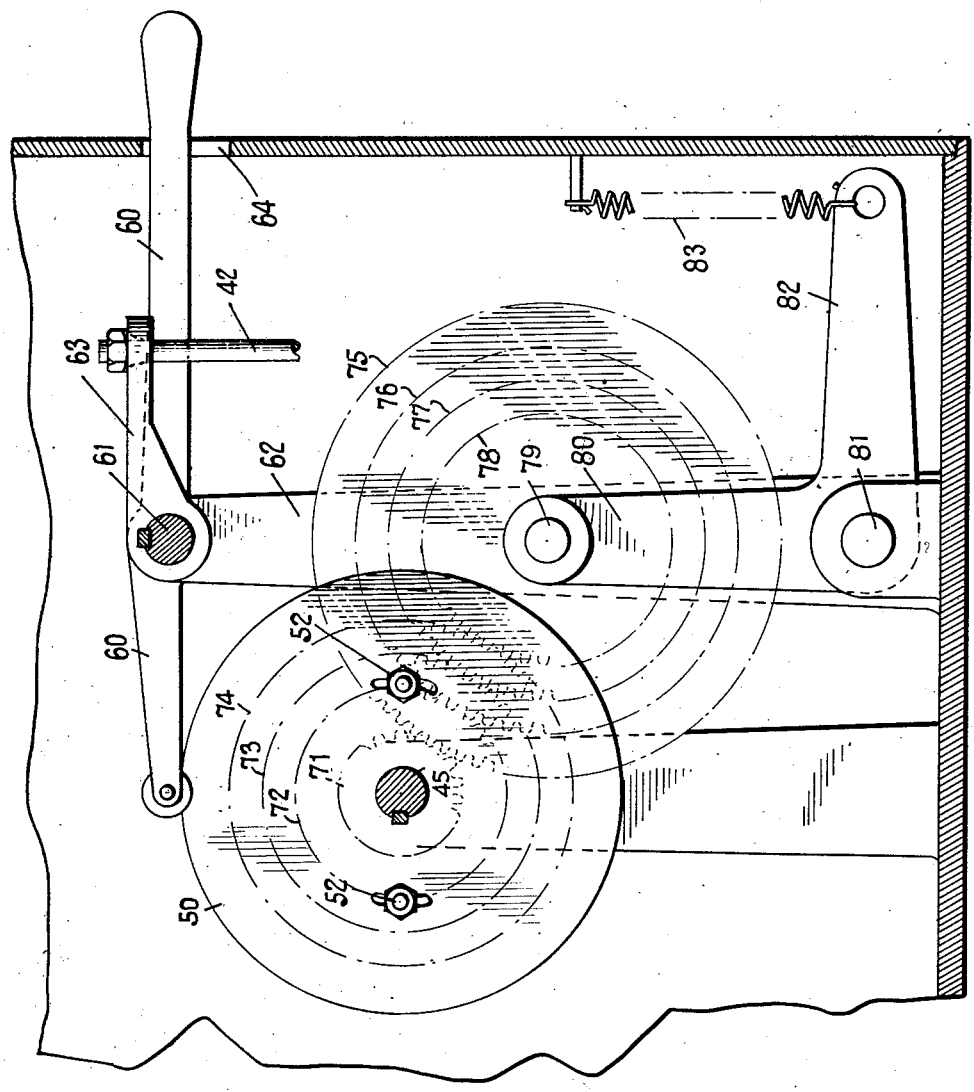

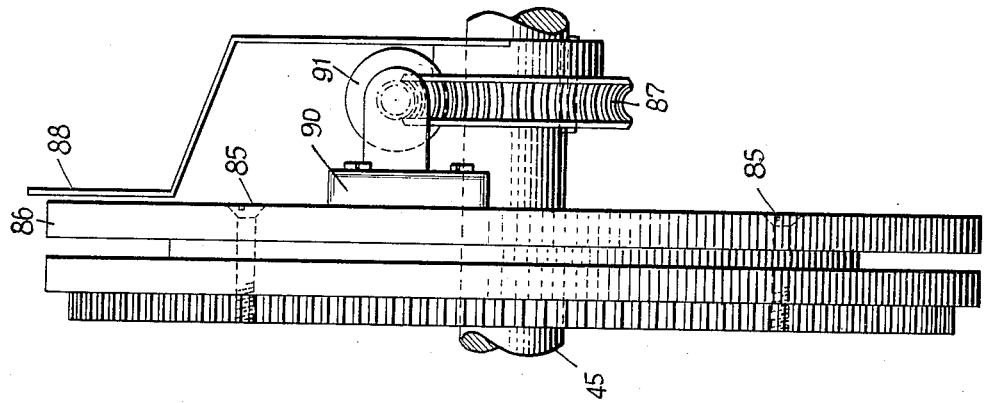
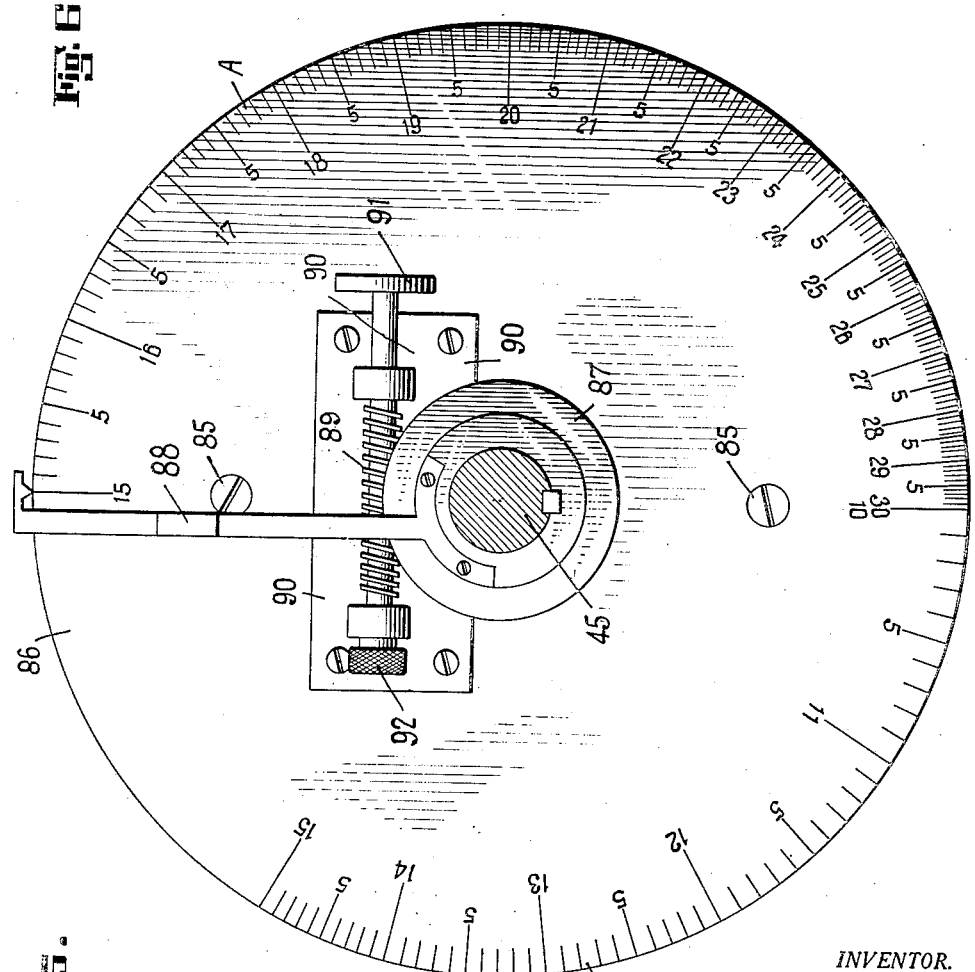

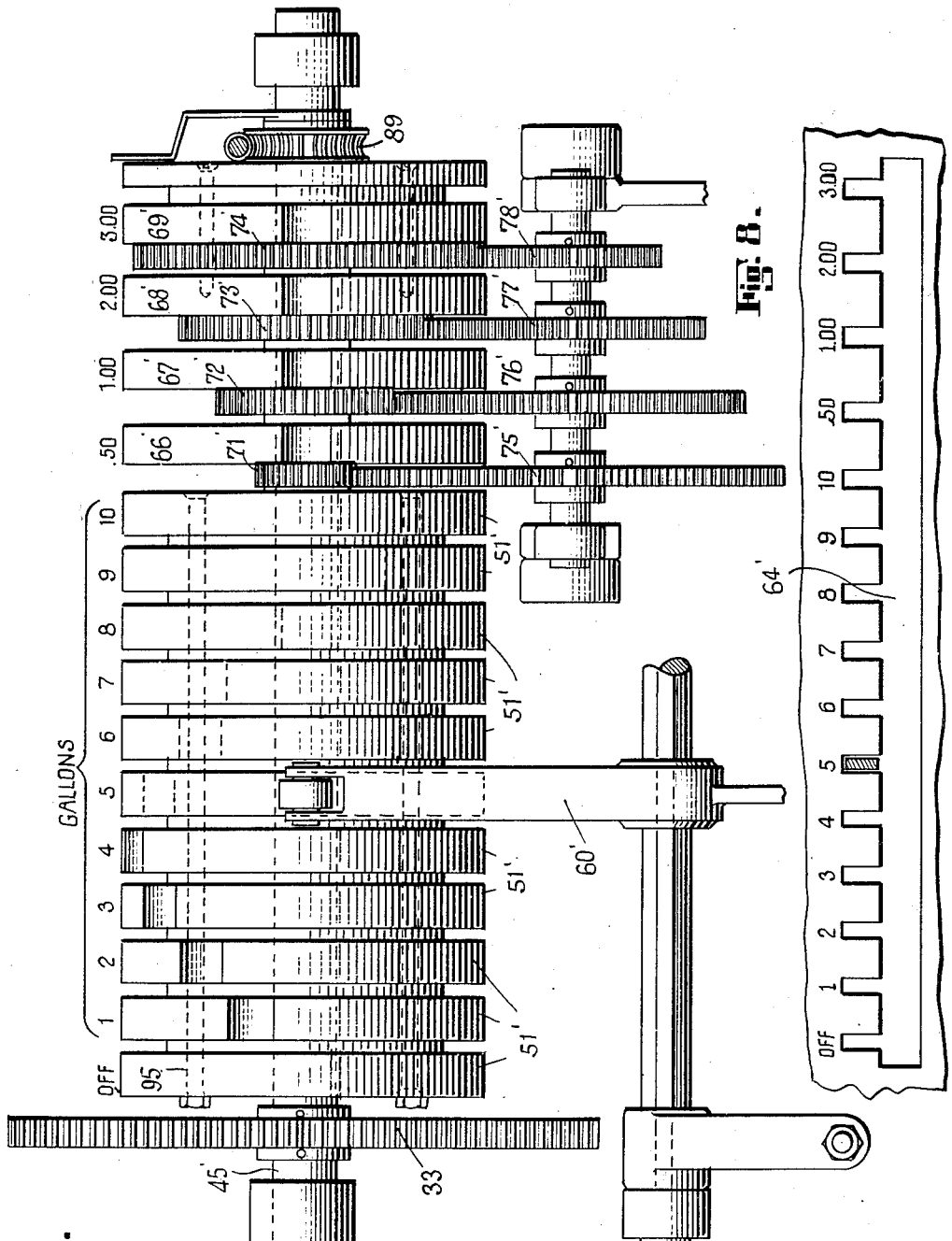

Patented Nov. 21, 1939

2,180,821

UNITED STATES PATENT OFFICE 2,180,821

FLUID DISPENSING APPARATUS

Henry Ginnel, Scarsdale, N. Y.

Application September 19, 1936, Serial No. 101,598

5 Claims. (Cl. 221—101)

This invention relates to flow control means for fluid measuring devices and has for an object the provision of improvements in this art.

One of the intended uses of the invention is in connection with gasoline dispensing devices, commonly known as "pumps," and it is adapted to be used as an accessory to such pumps for stopping the flow of gasoline when a predetermined amount has been delivered. The amount refers either to the quantity delivered according to liquid measure or gallonage, or according to the money value of the quantity delivered.

As gasoline pumps are constructed at present it is usually necessary for the operator to divide his attention between the filling nozzle at the tank filling opening of the car being served and the registering dials of the pump. This is true because most customers order either a given number of gallons or a given money's worth of gasoline, the recent trend being increasingly toward the latter.

On the other hand it is necessary for the operator to observe the pump dials, particularly near the end of the filling because he must stop exactly at the specified amount. If he serves less than the specified amount the customer will have a just complaint, and if he serves more than the specified amount the pump owner loses. On the other hand it is necessary for the operator to observe the filling nozzle or he will overfill the tank or for other reasons spill some of the gasoline dispensed and registered on the pump dials. This is particularly true of certain types of cars having long small filling tubes between the fender and the tank and in which an air lock is caused if filled too fast, to blow part of the gasoline so entrapped out of the filling opening. The customer is usually charged with the gasoline which is so spilled because it is registered on the pump dials as having been delivered.

As a consequence, the pump owner is required to keep skilled operators if he is to satisfy his customers and prevent losses to himself; but whether he keeps skilled operators or unskilled operators he is put to an unwarranted expense because in the former case he must lose by reason of higher wages paid and in the latter case he must lose by reason of the spillage or the overage of gasoline or by reason of dissatisfied customers or both.

According to the present invention an improved stop device is provided for use in conjunction with the present form of pumps, be they the latest computing type or the older type. This novel device may be set for a certain gallonage or for a certain amount of money and will automatically stop the flow of liquid or fluid when the predetermined point at which the device is set has been reached. The operator is thereby relieved from the necessity of observing the dials and may devote his entire attention to efficient use of the filling nozzle. This makes it possible to employ relatively unskilled operators and at the same time insures the owner against the loss of gasoline and of customers.

The device will be operated by parts driven from the discharge side of the liquid meter, just as are the present visible hand registering devices, in order that it may accurately register the amount of liquid delivered and be reset to zero when the hands are reset to zero. Preferably it is driven directly from the drive means of the present hand registering devices so it will keep in step therewith.

The device will limit the quantity of liquid delivered either by shutting off the pump motor or by shutting off the flow from the meter to the delivery nozzle. In the latter case the pressure limiting by-pass valve now employed between the pump and the meter will open when the flow from the meter is stopped and the gasoline or fluid pump is still running.

In the case where the device acts to shut off the motor the pump owner will realize a further saving by reason of shorter periods of operation of the motor. According to present practice the operation of the pump motor may be divided into three periods to wit: a first period from the time the operator removes the nozzle from its hook to start the motor until he inserts the nozzle in the filling opening of the car and opens the nozzle valve; a second period during which the nozzle valve is open for filling, and this period is lengthened by reason of the necessity for tapering off the quantity of fluid delivered near the end of the amount ordered while watching for air locks or overflow and attempting to stop exactly at the required amount on the dial; and a third period from the time the nozzle valve is closed until the nozzle is replaced on its hook to stop the motor. The device hereby proposed will avoid the third period entirely and reduce the time of the second period appreciably by avoiding the necessity for tapering off toward a given point on the dial and by permitting the operator to give his entire attention to the nozzle so as to permit faster filling without spillage. The power saving thus realized through shorter running periods of the motor may easily amount to one-third of the present power cost per delivery.

Another feature of the present invention is to provide a novel type of attachment that has two main portions. One portion operates to stop the flow of fluid when a certain number of gallons have been delivered. This part of the device may be used alone on the present computing pumps. The other main portion of the attachment herein is the computing portion, and the use of the complete attachment, i. e. gallonage and computing part, is particularly desirable when the device is attached to the old type of pump which has thereon only means for registering the number of gallons delivered. The improved attachment herein is small of size and may be ordered to have only the gallonage dispensing control or both the gallonage and the computing dispensing control.

It will be noted that this improved device costing from fifteen to twenty-five dollars may be added to the old type of pump costing about one-hundred and forty dollars and make that pump more serviceable than the new computing pumps which average in cost about two-hundred and sixty dollars.

Acknowledgment is hereby made of the construction of the old and of the computing types of pumps. The novel device which is the subject of this invention is an attachment to be added to both of the above types of pumps for making those pumps more efficient, for making positive that the customer is obtaining exactly what he ordered, and for saving the pump owner from losing his overfilling.

With the above objects and advantages in view, certain specific embodiments of the invention will be illustrated and described for purposes of illustration. In the accompanying drawings forming a part of the specification:

Fig. 2 is an enlarged top plan view of one form of stop device;

Fig. 3 is a side elevation taken exteriorly of the pump casing to show the setting device and scale employed therewith, the view being taken as from the left side of Fig. 1;

Fig. 4 is a vertical section taken on the line 4—4 of Fig. 2;

Fig. 5 is an end elevation taken on the line 5—5 of Fig. 4, showing the change-of-price setting means;

Fig. 6 is a side elevation of Fig. 5;

Fig. 7 is a top plan view similar to Fig. 2 showing a modification; and

Fig. 8 is a side elevation similar to Fig. 3 showing the amount setting means of the Fig. 7 modification.

Figure 1:
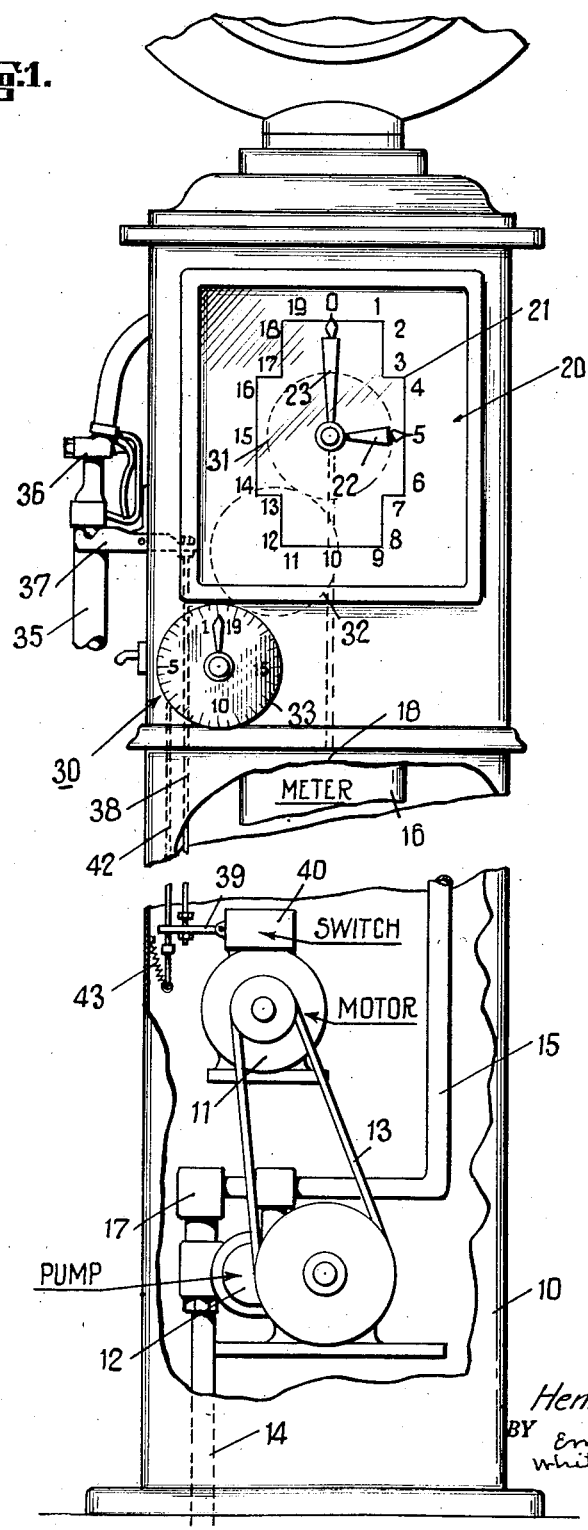
Fig. 1 is a vertical elevation of a pump assembly showing an exemplary application of a device according to the present invention.

Referring to Fig. 1, the pump selected for illustration in connection with the present invention comprises the usual stand 10 which is provided with interior supporting means for various mechanisms and with a removable outer casing permitting access to the mechanisms.

A motor 11 drives a pump 12, as for example through suitable pulleys and a belt 13. The pump receives fluid such as gasoline from a source of supply through an intake pipe 14. Fluid is discharged from the pump to the off-take pipe 15 leading to a fluid meter 16. In order to produce proper operation of the meter, fluid is supplied to it at substantially constant pressure. This will take care of low and high voltage conditions at the motor, the latter and the pump having an overcapacity sufficient to take care of the meter supply even under low voltage conditions. The oversupply of fluid is relieved from the meter supply pipe 15 by way of the by-pass valve 17, the excess fluid either being re-supplied to the pump or being returned to the source of supply.

The meter may be of the piston displacement type or any other approved type. Whatever the type of meter used, it will have sufficient power to drive a meter shaft 18. Through suitable drive connections of usual form the shaft 18 drives the moving parts of the indicating or register mechanism commonly provided with the pump. In the illustrated form of pump the register is generally denoted by the numeral 20, and comprises a dial 21 and indicating hands 22 and 23. The dial in this case is marked for gallons—from zero to twenty—and the shorter hand indicates gallons while the longer hand indicates fractions of gallons. A full turn of the fraction hand indicates one gallon, so obviously each alternate even figure on the dial denotes tenths of gallons. Quarter, half and three-quarter gallons are denoted when the fraction hand is at the numerals 5, 10 and 15 respectively. The pump may also carry computing mechanism but the particular pump selected for illustration does not carry it. This form of pump has been purposely selected to bring out the fact that the present invention provides a price computing mechanism which is useful when the pump as sold and installed carries no such mechanism; and there are a great number of such pumps in use. They are very modern, though not perhaps the very latest model and will not readily be discarded, so the device provided by the present invention should be a very useful and desirable accessory for such pumps since it is adapted for relatively easy attachment thereto.

It is to be understood that with any style of pump the hands or other indicating members are driven in only one direction by the meter shaft. They are reset to zero by turning them in a reverse direction, suitable one-way driving clutches or disconnectible clutches being provided for this purpose. In the pump illustrated, a manual reset knob 26 is provided on the shaft of the fraction hand and when this is reset to zero it carries the gallon hand back with it.

The flow control or stop mechanism according to the present invention is generally indicated in Fig. 1 by the numeral 30. It is driven from the one-way driving resetting mechanism of the pump which drives the indicator hands or similar devices. Specifically, in the present instance it is driven from the shaft on which the gallon hand is mounted through a suitable train of gears 31, 32, 33 shown in Fig. 1.

The pump is provided with a tube such as a flexible filling hose 35 which will usually be equipped with a hand operated nozzle valve 36 adapted to be operated by the attendant or operator as he fills the tank of a car. The nozzle end of the hose normally rests upon a hook support formed on the end of a lever 37. Connecting linkage 38 is provided between the lever 37 and an actuating member 39 of a motor control switch 40. When the nozzle is positioned on the hook the switch is operated to stop the operation of the motor; and when the nozzle is taken off the hook the switch will be operated to start the motor.

In addition to being subject to movement to the off position by the nozzle support, the switch may be moved to the off position by means provided by the present invention. As shown, an operating rod 42 extends from my stop device 30 to the switch actuating member 39. When the rod 42 is pulled up as by a spring 43 upon being released by mechanism hereinafter to be described it will also move the switch actuating arm 39 upward and stop the motor independently of the replacement of the nozzle on its hook.

Referring to Figs. 2 to 6, my stop device comprises a main shaft 45 mounted in suitable supports and driven by the gear 33. In this embodiment the gear 33 is not directly secured to the shaft 45 but is loosely mounted on a clutch sleeve 46 which is slidably but non-rotatably mounted on the shaft 45. The gear 33 carries a toothed clutch member 47 which co-operates with a similar toothed clutch member 48 integrally secured to the sleeve 46. The sleeve 46 and the clutch member 48 are slidable along a key or feather 49 which is secured to the shaft 45 and extends into a disc 50 which is mounted on the shaft 45. The disc 50 may be termed the idling or "off" disc and carries with it a volume or gallon disc 51. Clamping bolts 52 passing through holes in disc 51 and adjustable in arcuate slots in the disc 50 may be employed for securing the two discs together. The disc 51 is loose on the shaft 45 and the adjustment provided between it and the disc 50 is sufficient to take care of wear in the drive gears and other parts so the disc 51 may always be placed in accurate position.

The sleeve 46 passes outside the pump casing and has secured on the end thereof a hand knob 53 and a pointer 54. The pointer cooperates with a gallon scale 55 which is shown in elevation in Fig. 1. When the knob 53 is pushed inward against the spring 56 it carries with it the clutch member 48 and when the knob is turned after the clutch member 48 is disengaged from the mating clutch member 47 it will turn the shaft 45 and the discs 50 and 51. The scale 55 is marked in gallons and the scale shows the gallons in counter-clockwise notation, so when the knob 53 is turned it will be in a direction to set the pointer 54 along the scale at the figure indicating the number of gallons desired. Then the knob is released and the teeth of the clutch engage in the new position. This sets the gallon disc 51 back correspondingly so that a camming element such as a surface irregularity or notch 51a provided thereon will be required to travel a predetermined distance before it will trip certain stop mechanism associated with the disc. During this forward movement the disc notch returns to the zero position from which it was moved by the setting knob 53; but when the gear 33 and associated parts are turned backward in resetting the pump indicating hands 22, 23 to zero the notch will again be moved backward, so it will be necessary to move the parts forward again to the zero position or any desired gallonage position before the next customer is served. Otherwise the same amount would be dispensed at the next operation of the stop device.

The means provided for cooperating with the cam disc 51 for shutting off the flow of fluid comprises a cam follower lever 60 pivoted upon and slidably splined to a shaft 61. The shaft 61 is journalled in suitable supports 62 and on one end is provided with an operating arm 63 to which the rod 42 for operating the motor switch may be adjustably connected. The cam disc may be referred to as the tripping element and the lever may be referred to as the tripped element. From Fig. 4 it will be clear that when the disc 51 is rotated until its notch is in the top vertical position the roller on the end of the lever 60 will drop into the notch thus turning the shaft 61 and raising the end of the arm 63. Since the rod 42 attached to the end of the arm 63 is urged upward by a spring, the motor switch will be operated as soon as the notch in the disc permits the end of the lever to drop.

The outer end of the lever 60 extends through the pump casing, a longitudinal slot 64 being provided therefor. There are a plurality of notches on the upper edge of the slot aligning in position with the discs on shaft 45. The "off" and "gal" notches indicated in Fig. 3 are aligned with the off disc 50 and the gallon disc 51 respectively. The operator may grasp the projecting end of the lever 60 and move it down to raise the roller at the inner end thereof from a disc. He may then slide the lever along the splined shaft 61 until it is at the desired position and when he releases it the roller of the lever will ride upon the desired cam disc. Only two discs have been mentioned thus far, the gallon disc and the off disc but there may be a plurality of gallon discs, and certain price discs also if desired as will be described hereinafter. The off disc being concentric and without surface irregularities will keep the lever 60 in inoperative position continuously. The other discs being concentric in part and notched will hold the lever in inoperative position only until the notch comes beneath the end of the lever.

The shaft 45 may be given any desired speed of rotation so long as it is kept in step with the shaft of the register hands. In the present instance the shaft 45 is given one rotation every time the pump dispenses twenty gallons of gasoline; in other words it turns at the same rate as the shaft of the gallon hand of the register. In the one case in which twenty gallons is to be dispensed, the notch of the disc will start from and stop in the upper position, so in this case it will be necessary for the operator to depress the outer end of the lever 60 to raise the inner end from the notch at the beginning of the servicing. It may be observed, however, that modern automobiles seldom are equipped with tanks holding as much as twenty gallons, so this will cause little inconvenience.

Means are provided for stopping the pump delivery when a certain price is reached. Customers usually ask for even amounts when obtaining gasoline according to money value. The amounts most frequently called for are fifty cents, one dollar, two dollars or three dollars. I have taken advantage of this situation to devise apparatus which is extremely simple and inexpensive, yet entirely accurate and reliable. There may be provision for a greater number or a smaller number of amounts than the four mentioned above, but these are sufficient to illustrate the principles of the invention so have been selected as the basis of the apparatus disclosed.

Accordingly there are provided the fifty cent cam disc 66, the dollar disc 67, the two dollar disc 68 and the three dollar disc 69.

These discs are rotatably mounted on the shaft 45 but are held in fixed axial position by any suitable means, including in part the washers 70. The discs 66, 67, 68, 69 are provided with integral gears 71, 72, 73, 74, respectively. These gears 71, 72, 73, 74 respectively mesh with gears 75, 76, 77, 78 mounted on a jack shaft 79. The gears may be secured to the jack shaft by removable pins 84. The jack shaft 79 is mounted in supports of any suitable character which will permit the gears to be disengaged and engaged when desired. The supports illustrated comprise standards 80 of a frame which is pivoted at 81. A handle 82 is attached to the frame and is located at a point convenient to the operator. The handle is urged into gear meshing position by a spring 83. The price discs are all placed so their notches are in alignment when in the zero position. They achieve their function of dispensing different amounts by different speeds of rotation, having speeds of rotation in proportion to the amounts denoted. Accordingly, the gears are so selected that there is a one and one-half to one speed drive from the three dollar disc to the two dollar disc; a three-to-one drive from the three dollar disc to the dollar disc; and a six-to-one drive from the three dollar disc to the fifty cent disc.

Means are provided for making adjustment for different prices per gallon at which the gasoline may be selling. This mechanism is shown particularly in Figs. 5 and 6. Here it will be seen that the three dollar disc 69 carries integrally with it, as by attaching screws 85, a price scale plate 86 which is also free to rotate on the shaft 45. Fixed to the shaft 45 at the outer side of the plate 86 is a worm gear 87 carrying a pointer 88 cooperatively mounted with respect to the scale on the plate 86. A worm 89 is mounted on brackets 90 secured to the plate 86 and is provided with a thumb piece 91 whereby it may be turned relative to the worm gear 87 so as to cause relative rotation between the gear and plate 86, that is, to move the scale relative to the pointer 88. The scale is marked in cents and fractions (tenths) of a cent per gallon so when the pointer registers with a given mark on the scale it will indicate the price at which the gasoline is selling. A lock nut 92 is provided for holding the worm shaft in various adjusted positions.

Any desired base for the price scale may be used but the principal one A illustrated (two scales being shown) is based on fifteen cents per gallon. This means that the three dollar disc 69 which, except for price adjustment, is substantially fixed to the shaft 45 through the plate 86, worm 89 and worm gear 87, makes one revolution every time the shaft 45 makes one revolution. Since one revolution represents the delivery of twenty gallons, it follows that the unit price to produce a three dollar total will be fifteen cents per gallon. On this basis all of the discs 66, 67, 68, 69 would make one revolution when amounts of gasoline corresponding to their respective values had been dispensed. At prices higher than fifteen cents per gallon all of the discs will be turned forward in the direction of rotation so it will not be necessary to lift the end of lever 60 from a notch when starting as it would be at fifteen cents per gallon on this scale.

If some other price scale such as B is desired it is only necessary to make one up upon a selected base price to substitute for the scale A.

In changing from scale A to scale B it is only necessary to disconnect the three dollar disc 69 from the scale plate 86 by removing the screws 85. The plate 86 is then turned by the worm 89 through 180° to bring the base number (10 cents per gallon in this case) of scale B into top position in registry with the pointer 88. Longer screws 85 are then used to secure both the three dollar disc 69 and the two dollar disc 68 as well to the scale plate 86. The pin connecting gear 78 to the jack shaft 79 is removed making this an idling gear so the two dollar disc can rotate with the three dollar disc. That is, the two dollar disc will now make one rotation each time the shaft 45 makes one rotation and the three dollar disc will be blanked off. With scale B it will be necessary to lift the trip arm 60 to start when the price is ten cents per gallon but for all higher prices the discs will make less than one revolution so this will not be necessary.

In making adjustment for different prices per gallon, the drive gears 75, 76, 77, 78 are disengaged from their companion gears 71, 72, 73, 74 and the worm 89 is turned to bring the desired price on the scale opposite the pointer 88. Then the worm is locked in position by the lock nut 92. The discs 66, 67, 68 are then turned by hand until their notches are in alignment with the notch of the disc 69, whereupon the gears are again re-engaged. The proper alignment of the notches can readily be determined visually but if desired a pencil or rod may be placed in the notches to assure proper alignment.

The embodiment shown in Fig. 8 varies from the embodiment described above in that it is provided with a plurality of gallon discs 51' keyed to the shaft 45' instead of the single disc 51 which is adjustable on the shaft. As many of these discs may be provided as desired. Ten are illustrated and their notches are spaced circumferentially so as to provide for delivery of from one to ten gallons. When a plurality of gallon discs are employed the trip lever 60' will be moved axially to the desired disc before delivery. The discs 51' are secured together by rods 95, each disc being provided with twenty holes so it may be secured in the assembly in any desired position. The "off" disc 50' and the price discs 66', 67', 68', 69' and other mechanisms are the same as in the previous form.

The operation of the device is as follows: A car stops at the filling station for gasoline and the owner asks for a given amount, say five gallons or one dollar's worth. Suppose the pump to be equipped with the first form of stop device described above, that is, the one with the adjustable gallon disc and the price discs. The operator goes to the pump and sees that all parts are set back to zero. Then he turns the knob back until the pointer stands at five gallons; or he slides the projecting hand-piece of the cam follower lever along the slot in the casing until it is beneath the "$1" notch and lets it down on the dollar disc. It will be assumed that the price for the day has already been set up by the pump owner by proper adjustment of the price setting mechanism at the right end of the attachment.

The operator then lifts the pump nozzle off the hook lever and pushes the lever upward to start the pump motor, after which he inserts the nozzle into the filling opening of the tank of the car and opens the nozzle valve to allow gasoline to flow into the tank. He may keep the valve wide open except to avoid spillage on account of air locks or overfilling, and in any event he may give his entire attention to the nozzle without diverting his attention to the pump. When the proper amount has been delivered the stop device will cause the motor to cease operating and hence stop the delivery of gasoline. The operator then returns the nozzle to its hook lever and resets the pump hands to zero. After this he sets the pointer up to zero and moves the cam follower lever to "off" position unless he wishes to leave the apparatus set to deliver five gallons, if this was the setting. Or he moves the cam follower lever back to "off" position from the dollar disc, unless he wishes to leave the apparatus set to deliver a dollar's worth, if this was the setting.

In case the form of apparatus shown in Fig. 7 is used and five gallons is the amount desired, the cam follower lever will be moved until it rides upon the five gallon disc. Then after filling it is moved back to "off" position or to such other position as may be desired for the next filling.

In setting the apparatus for change in price, it is only necessary to open the pump casing at the right end of the stop apparatus, loosen the lock nut on the worm shaft and turn the thumb piece on the worm shaft until the desired price on the scale plate comes beneath the pointer. Then the lock nut is tightened again. The worm and worm gear are in a measure self locking but the lock nut is provided for further assurance that the parts remain in the position at which they are set.

For prices above fifteen cents, the scale A will be used. For fifteen cents or less down to ten cents the scale B will be used. The procedure to be followed in changing from one scale to another has already been described.

It will thus be seen that the present invention provides very effective yet very simple and inexpensive apparatus for stopping the flow of fluid by a fluid dispensing device when the desired amount has been delivered; that the same apparatus may be used as well for price delivery as for gallonage delivery but without involving the highly intricate and expensive price computing mechanism which is usually associated with pumps; and that the apparatus may be quickly and easily set for different prices. Besides saving the usual spillage, the present device provides the pump owner a saving in the permissible employment of less skilled operators and also in lower power costs due to shorter running periods of the pump motor. Other advantages will be obvious to those skilled in this art from the above description of exemplary embodiments of the invention.

While certain forms of apparatus embodying the invention have been illustrated and described in detail for the purpose of disclosing the principles of the invention, it is to be understood that the invention may be variously embodied within the limits of the prior art and the scope of the subjoined claims.

I claim:

1. Stop mechanism for dispensing apparatus, comprising in combination, a rotating trip element and a contact element engageable with the rotating element, said rotating element including a plurality of axially and circumferentially spaced actuating elements, said contact element being adjustable in an axial direction to engage various selected actuating elements to stop the delivery when various predetermined amounts have been dispensed.

2. Apparatus as set forth in claim 1 in which said rotating element includes a plurality of axially spaced discs provided with a series of surface camming elements, and in which said contact element includes a cam follower arm slidably secured to a shaft for axial adjustment with selected ones of said discs, and means actuated by said arm for causing stoppage of delivery.

3. Apparatus as set forth in claim 1 in which said rotating element comprises a cam disc provided with a camming element thereon, a shaft on which said cam disc is mounted, a drive gear rotatably but non-slidably mounted on said shaft, a clutch connection between said gear and disc permitting circumferential adjustment of the disc for selective predetermined amounts, and said contact element including a swingable cam-follower arm adapted to cooperate with said cam to stop the delivery when the selected amount has been dispensed.

4. Apparatus as set forth in claim 1 in which said rotating element comprises a cam disc provided with a camming element thereon, a shaft on which said cam disc is mounted, a drive gear rotatably but non-slidably mounted on said shaft, a clutch connection between said gear and disc permitting circumferential adjustment of the disc for selective predetermined amounts, a visible indicating scale and pointer cooperatively associated with said disc, and said contact element including a swingable cam-follower arm adapted to cooperate with said cam to stop the delivery when the selected amount has been dispensed.

5. Stop mechanism for dispensing apparatus, comprising in combination, a shaft driven by metering mechanism of the apparatus, a tripping cam disc secured to said shaft, a cam follower member cooperating with the cam disc for stopping delivery by the apparatus, a sleeve slidable on and splined on said shaft, a clutch element secured to said sleeve, a driving gear rotatably but non-slidably mounted on said sleeve, a clutch element secured to said gear and mounted in cooperative relationship to the first mentioned clutch element, a hand knob and a pointer secured to said sleeve, and a fixed scale secured in cooperative relationship to said pointer.

HENRY GINNEL.